US010029862B2

(12) United States Patent
Kimura et al.

(10) Patent No.: US 10,029,862 B2
(45) Date of Patent: Jul. 24, 2018

(54) CONVEYING SYSTEM

(71) Applicant: MURATA MANUFACTURING CO., LTD., Kyoto-fu (JP)

(72) Inventors: Nobumichi Kimura, Kyoto-fu (JP); Yoji Itagaki, Kyoto-fu (JP); Kazuo Miyake, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 304 days.

(21) Appl. No.: 14/546,149

(22) Filed: Nov. 18, 2014

(65) Prior Publication Data
US 2015/0151926 A1 Jun. 4, 2015

(30) Foreign Application Priority Data

Dec. 2, 2013 (JP) ................................ 2013-248914
Feb. 21, 2014 (JP) ................................ 2014-031247
May 26, 2014 (JP) ................................ 2014-107969

(51) Int. Cl.
*B07C 5/00* (2006.01)
*B65G 47/71* (2006.01)
(Continued)

(52) U.S. Cl.
CPC ............. *B65G 47/715* (2013.01); *B07C 5/34* (2013.01); *B07C 5/36* (2013.01); *B07C 5/362* (2013.01); *B07C 2501/0009* (2013.01)

(58) Field of Classification Search
CPC .... B07C 5/34; B07C 5/36; B07C 5/38; B07C 5/361; B07C 5/362; B07C 2501/0009; B07C 11/06; B65G 47/30; B65G 47/715
(Continued)

(56) References Cited

U.S. PATENT DOCUMENTS 5,842,818 A * 12/1998 Simkowski .......... B65G 47/715
 406/182
7,318,722 B2 * 1/2008 Drysdale .............. B65G 47/648
 198/363
2009/0000915 A1 * 1/2009 Nadreau ................... B07C 5/34
 198/469.1

FOREIGN PATENT DOCUMENTS

JP S53-109369 A 9/1978
JP S63-139224 U 9/1988
(Continued)

*Primary Examiner* — Joseph C Rodriguez
*Assistant Examiner* — Kalyanavenkateshware Kumar
(74) *Attorney, Agent, or Firm* — Studebaker & Brackett PC

(57) ABSTRACT

A conveying system includes a first belt conveyor; a second belt conveyor; a workpiece guide that includes guide paths that receive workpieces that have fallen from a downstream end portion of the first belt conveyor one by one and then guide the workpieces to an upstream end portion of the second belt conveyor; a rotary mechanism that displaces the downstream end portion along a substantially arc-shaped trajectory to distribute the workpieces that have fallen from the downstream end portion into the guide paths; a first sensor that detects first information that represents that one of the workpieces has fallen from the downstream end portion; and a controlling device that controls an operation of the rotary mechanism. The controlling device controls the rotary mechanism by transmitting an operation command to the displacement mechanism to intermittently displace the downstream end portion by a predetermined distance in response to first information.

5 Claims, 18 Drawing Sheets

(51) Int. Cl.
*B07C 5/34* (2006.01)
*B07C 5/36* (2006.01)

(58) Field of Classification Search
USPC .................................................. 209/552, 651
See application file for complete search history.

(56) References Cited

FOREIGN PATENT DOCUMENTS

| | | |
|---|---|---|
| JP | H02-305711 A | 12/1990 |
| JP | H06-11951 Y2 | 3/1994 |
| JP | H06-59324 U | 8/1994 |
| JP | H11-130238 A | 5/1999 |
| JP | H11-246031 A | 9/1999 |
| JP | 2008-230846 A | 10/2008 |
| JP | 2012-055859 A | 3/2012 |

* cited by examiner

CONVEYING SYSTEM

CROSS REFERENCE TO RELATED APPLICATIONS

This application claims benefit of priority to Japanese Patent Application Nos. 2014-107969 filed May 26, 2014, 2014-031247 filed Feb. 21, 2014, and 2013-248914 filed Dec. 2, 2013, the entire content of each of which is incorporated herein by reference.

TECHNICAL FIELD

The present technical field relates to a conveying system that conveys an object (hereinafter referred to as a workpiece) such as an electric component.

BACKGROUND

A screening system for screening workpieces to remove defective workpieces that do not satisfy predetermined conditions requires a conveying system that conveys workpieces from a workpiece feeding mechanism to a defective-piece inspection area.

As an example of a screening system including such a conveying system, FIG. 18 illustrates a screening system 301 described in Japanese Unexamined Patent Application Publication No. 2012-55859.

The screening system 301 according to Japanese Unexamined Patent Application Publication No. 2012-55859 conveys workpieces W, including fine workpieces GW and defective workpieces NW, from a feeding mechanism 302 to an inspection area 303.

The workpieces W are conveyed by a conveying system that includes a belt conveyor 304 and a slide 305 that guides the workpieces W fed from the feeding mechanism 302 to the belt conveyor 304.

The slide 305 has a vibrating mechanism, not illustrated, attached thereto. When the vibrating mechanism applies vibrations to the slide 305, the workpieces W move over the slide 305 and are conveyed to a front end portion of the belt conveyor 304.

Subsequently, the workpieces W are conveyed by circulation of the belt at a predetermined speed from the front end portion to a rear end portion of the belt conveyor 304.

The workpieces W that have arrived at the rear end portion of the belt conveyor 304 are thrown toward the inspection area 303 by the momentum gained while the workpieces W are conveyed by the belt conveyor 304. The inspection area 303 is a space defined by an emitting device 303a, which applies electromagnetic waves such as visible light or x-rays to the workpieces W, and a receiver 303b.

The electromagnetic waves received by the receiver 303b vary depending on the state of the workpieces W that pass through the inspection area 303. Specifically, the workpieces W are determined whether they are fine workpieces GW or defective workpieces NW in response to information of the electromagnetic waves received by the receiver 303b.

In the screening system 301 described in Japanese Unexamined Patent Application Publication No. 2012-55859, the workpieces W are continuously fed from the feeding mechanism 302 and conveyed without being neatly arranged. Thus, the workpieces W may be conveyed while overlapping one another over the slide 305 or the belt conveyor 304.

In such a case, if the workpieces W are thrown to the inspection area 303 while overlapping one another, the individual workpieces W fail to be uniformly irradiated with the electromagnetic waves and thus fail to be correctly determined as to whether they are fine workpieces GW or defective workpieces NW.

The problem that occurs when workpieces W are conveyed while overlapping one another as described above can occur in systems other than the screening system that sorts workpieces into fine workpieces GW and defective workpieces NW by irradiating the workpieces W with electromagnetic waves as in the case of the screening system described in Japanese Unexamined Patent Application Publication No. 2012-55859.

For example, in a screening system that inspects the appearance of workpieces using a camera or other devices during conveyance, if the workpieces are conveyed while overlapping one another, part of the workpieces fails to be visually inspected and thus the workpieces fail to be correctly determined as to whether they are fine workpieces or defective workpieces.

In a curing apparatus that causes resin to cure completely by irradiating workpieces containing a photocurable resin material that has been cured temporarily with light having a predetermined wavelength during conveyance, if the workpieces are conveyed while overlapping one another, part of the workpieces fails to be irradiated with light and thus the resin cures unevenly.

In addition, in a heat treatment apparatus that heats workpieces, to each of which another component has been temporarily fixed by thermosetting resin or solder, using an infrared-ray heater during conveyance to completely fix the component to each workpiece, if the workpieces are conveyed while overlapping one another, the workpieces fail to be evenly heated and the components fail to be fixed to the workpieces at an even strength.

SUMMARY

Accordingly, the present disclosure aims to provide a conveying system that can convey workpieces while the workpieces are separated from one another without overlapping one another, the conveying system being required in various types of processing apparatuses.

Since the present disclosure provides a conveying system that can convey workpieces while the workpieces are separated from one another without overlapping one another, the present disclosure enables improvement of a mechanism that distributes workpieces over a conveying mechanism of a conveying system and that controls the positions on the conveying mechanism to which the workpieces are conveyed.

A conveying system according to an embodiment of the present disclosure includes a first conveying mechanism, a second conveying mechanism, a workpiece guide, a displacement mechanism, a first sensor, and a controlling device.

The first conveying mechanism is configured to convey a plurality of workpieces while keeping the workpieces in a row.

The second conveying mechanism is configured to convey the workpieces that have finished being conveyed by the first conveying mechanism, the second conveying mechanism having a width that allows the workpieces to be conveyed in a plurality of rows.

The workpiece guide is disposed between a downstream end portion of the first conveying mechanism and an upstream end portion of the second conveying mechanism. The workpiece guide includes a plurality of guide paths distributed in a widthwise direction of the second conveying mechanism, the guide paths receiving workpieces that have fallen from the downstream end portion of the first conveying mechanism one by one and then guiding the workpieces to the upstream end portion of the second conveying mechanism.

The displacement mechanism displaces the downstream end portion of the first conveying mechanism within a range within which the plurality of guide paths are distributed so as to distribute the workpieces that have fallen from the downstream end portion of the first conveying mechanism into each of the plurality of guide paths.

The first sensor detects first information that represents that at least one of the workpieces has fallen from the downstream end portion of the first conveying mechanism.

The controlling device controls an operation of the displacement mechanism in response to the first information by providing the displacement mechanism with an operation command to intermittently displace the downstream end portion of the first conveying mechanism by a predetermined distance such that the downstream end portion of the first conveying mechanism is aligned with at least one selected guide path of the plurality of guide paths and the workpiece that has fallen from the downstream end portion of the first conveying mechanism is allowed to pass through the selected guide path.

In the above-described conveying system, the controlling device transmits an operation command to the displacement mechanism to intermittently displace the downstream end portion of the first conveying mechanism by a predetermined distance in response to the first information that represents that one of the workpieces has fallen from the downstream end portion of the first conveying mechanism.

As a result of the operation of the displacement mechanism, the downstream end portion of the first conveying mechanism is aligned with a selected one of the plurality of guide paths. Consequently, the workpiece that has fallen from the downstream end portion of the first conveying mechanism passes through the selected guide path and is then transferred to a certain position at the upstream end portion of the second conveying mechanism.

When a subsequent workpiece is to fall, the downstream end portion of the first conveying mechanism has been displaced either leftward or rightward by a predetermined distance and aligned with a guide path that is different from the guide path through which the previous workpiece has passed.

Thus, the subsequent workpiece passes through a guide path that is a predetermined distance apart from the guide path through which the previous workpiece has passed. The subsequent workpiece is then transferred to a position at the upstream end portion of the second conveying mechanism, the position being different in a direction perpendicular to the conveyance direction of the workpieces from the position to which the previous workpiece has been transferred. In other words, the controlling device controls the positions on the second conveying mechanism to which the workpieces are conveyed by operating the displacement mechanism in response to the first information to intermittently displace the downstream end portion of the first conveying mechanism.

Thus, the conveying system according to an embodiment of the present disclosure distributes the workpieces in such a manner that the workpieces do not overlap one another on the second conveying mechanism. In other words, in the case where the workpieces are subjected to a certain operation while being conveyed on the second conveying mechanism, the workpieces can be efficiently subjected to the operation without causing defects due to overlapping of the workpieces.

In conveying systems according to preferred embodiments of the present disclosure, the first conveying mechanism is supported so as to be rotatable around an axis extending in a substantially vertical direction. The displacement mechanism includes a rotary mechanism that rotates the first conveying mechanism such that the downstream end portion of the first conveying mechanism is displaced along a substantially arc-shaped trajectory in a substantially horizontal plane.

The plurality of guide paths of the workpiece guide are arranged in a substantially arc shape at predetermined intervals when viewed from above. The rotary mechanism intermittently rotates the first conveying mechanism such that the downstream end portion of the first conveying mechanism is aligned with at least one selected guide path of the plurality of guide paths.

In the above-described conveying system, the displacement mechanism includes a rotary mechanism. As a result of the operation of the rotary mechanism, the downstream end portion of the first conveying mechanism is intermittently displaced along the substantially arc-shaped trajectory in a substantially horizontal plane so as to be aligned with a selected one of the multiple guide paths arranged in a substantially arc shape at predetermined intervals when viewed from above.

As described above, use of a device including a rotary mechanism, such as a motor in which a rotary encoder is installed, as a displacement mechanism enables reduction of components, thereby reducing costs.

In conveying systems according to other preferred embodiments of the present disclosure, the first conveying mechanism is supported so as to be capable of being translated in the widthwise direction of the second conveying mechanism. The displacement mechanism includes a linear motion mechanism that linearly moves the downstream end portion of the first conveying mechanism in a substantially horizontal direction.

The plurality of guide paths of the workpiece guide are arranged in a straight line at predetermined intervals when viewed from above. The linear motion mechanism intermittently translates the first conveying mechanism such that the downstream end portion of the first conveying mechanism is aligned with at least one selected guide path of the plurality of guide paths.

In the above-described conveying system, the displacement mechanism includes a linear motion mechanism. As a result of the operation of the linear motion mechanism, the downstream end portion of the first conveying mechanism is intermittently translated in a substantially horizontal direction so as to be aligned with a selected one of the multiple guide paths arranged in a straight line at predetermined intervals when viewed from above.

As in the above-described case, use of a device that includes a linear motion mechanism, such as a linear motor in which a linear encoder is installed, as a displacement mechanism enables reduction of the level of inertia of the displacement mechanism, thereby increasing the moving response of the first conveying mechanism.

In a conveying system according to another preferred embodiment of the present disclosure, the conveying system further includes a feeding mechanism that feeds the workpieces to the first conveying mechanism. The controlling device further controls the feeding mechanism in response to the first information such that the feeding mechanism feeds the workpieces to the first conveying mechanism.

In the above-described conveying system, the conveying system includes a feeding mechanism. The feeding mechanism feeds workpieces to the first conveying mechanism under the control of the controlling device in response to the first information. Specifically, the workpieces fall from the downstream end portion of the first conveying mechanism at predetermined time intervals and are then fed to the first conveying mechanism.

A period after a certain workpiece has passed through a selected one of the guide paths until a subsequent workpiece arrives at the downstream end portion of the first conveying mechanism is sufficient for the downstream end portion of the first belt conveyor to be displaced either leftward or rightward by a predetermined distance.

Thus, a workpiece that is to fall after the certain workpiece has reliably fallen passes through a guide path that is a predetermined distance apart from the guide path through which the previous workpiece has passed. In other words, workpieces are further reliably transferred to positions at the upstream end portion of the second conveying mechanism, the positions being different in the direction perpendicular to the conveyance direction of the workpieces from the position to which the previous workpiece has been transferred.

In a conveying system according to another preferred embodiment of the present disclosure, the conveying system further includes a second sensor and a removal mechanism configured to remove a desired one of the workpieces on the first conveying mechanism. The second sensor detects second information that represents that at least one of the workpieces has passed a predetermined position between an upstream end and a downstream end of the first conveying mechanism. The controlling device determines whether a time interval between a first detection time and a subsequent second detection time at each of which the second information is detected by the second sensor is shorter than a predetermined time interval or not. When the time interval between first detection time and subsequent second detection time at each of which the second information is detected by the second sensor is shorter than the predetermined time interval, the controlling device further controls the removal mechanism by providing the removal mechanism with an operation command to remove at least one of the workpieces that has passed the predetermined position at the second detection time.

In the above-described conveying system, the time intervals between the first detection time and the subsequent second detection time at which the second information is transmitted by the second sensor 100 serve as an index of the intervals between workpieces on the first conveying mechanism. The time interval between the first detection time and the subsequent second detection time of the second information that is shorter than a predetermined time interval means that, for some reason, a workpiece that disturbs the predetermined interval is disposed on the first conveying mechanism.

In such a case, the controlling device operates the removal mechanism so that the removal mechanism removes the workpiece that disturbs the predetermined interval. Consequently, the intervals between workpieces during conveyance are reliably kept larger than or equal to a predetermined interval.

Thus, a period after a certain workpiece has passed through a selected one of the guide paths until a subsequent workpiece arrives at the downstream end portion of the first conveying mechanism is sufficient for the downstream end portion of the first conveying mechanism to be displaced either leftward or rightward by a predetermined distance.

Thus, a workpiece that is to fall, after the certain workpiece W reliably falls, passes through a guide path that is a predetermined distance apart from the guide path through which the previous workpiece has passed. In other words, workpieces are further reliably transferred to positions at the upstream end portion of the second conveying mechanism, the positions being different in the direction perpendicular to the conveyance direction of the workpieces from the position to which the previous workpiece has been transferred.

In the conveying system according to an embodiment of the present disclosure, in response to the first information that represents that a workpiece has fallen from the downstream end portion of the first conveying mechanism, the controlling device transmits an operation command to the displacement mechanism to intermittently displace the downstream end portion of the first conveying mechanism by a predetermined distance.

As a result of the operation of the displacement mechanism, the downstream end portion of the first conveying mechanism is aligned with a selected one of the multiple guide paths. Consequently, the workpiece that has fallen from the downstream end portion of the first conveying mechanism passes through the selected guide path and is then transferred to a certain position at the upstream end portion of the second conveying mechanism.

When a subsequent workpiece is to fall, the downstream end portion of the first conveying mechanism has been displaced either leftward or rightward by a predetermined distance and aligned with a guide path different from the guide path through which the previous workpiece has passed.

Thus, the subsequent workpiece passes through a guide path that is a predetermined distance apart from the guide path through which the previous workpiece has passed. Thus, the subsequent workpiece is transferred to a position at the upstream end portion of the second conveying mechanism, the position being different in the direction perpendicular to the conveyance direction of the workpieces from the position to which the previous workpiece has been transferred.

Thus, the conveying system according to an embodiment of the present disclosure distributes workpieces in such a manner that the workpieces do not overlap one another on the second conveying mechanism. In other words, when workpieces are subjected to a certain operation while being conveyed on the second conveying mechanism, the workpieces can be efficiently subjected to the operation without causing defects due to overlapping of the workpieces.

Other features, elements, characteristics and advantages of the present disclosure will become more apparent from the following detailed description of preferred embodiments of the present disclosure (with reference to the attached drawings).

BRIEF DESCRIPTION OF THE DRAWINGS

FIG. 4A is a top view of the guide body 41, FIG. 4B is a side view of the guide body 41, FIG. 4C is a cross-sectional view of the guide body 41 taken along the line 4-4 in FIG. 4A, and FIG. 4D is a perspective view of a guide path 42e representing guide paths 42a to 42i formed in the guide body 41.

FIG. 6A illustrates the state where the downstream end portion of the first belt conveyor 10 is aligned with the guide path 42d and a workpiece W0 is passing through the guide path 42d, FIG. 6B illustrates the state where the downstream end portion of the first belt conveyor 10 is aligned with the guide path 42e after the workpiece W0 has passed through the guide path 42d and the first belt conveyor 10 has been rotated in the substantially horizontal plane, FIG. 6C illustrates the state where a workpiece W1 is passing through the guide path 42e while the downstream end portion of the first belt conveyor 10 is in the state illustrated in FIG. 6B, and FIG. 6D illustrates the state where the downstream end portion of the first belt conveyor 10 is aligned with the guide path 42f after the workpiece W1 has passed through the guide path 42e and the first belt conveyor 10 has been rotated in the substantially horizontal plane.

FIG. 10A is a top view of the guide body 41, FIG. 10B is a side view of the guide body 41, FIG. 10C is a cross-sectional view of the guide body 41 taken along the line 10-10 in FIG. 10A, and FIG. 10D is a perspective view of a guide path 42e representing guide paths 42a to 42i formed in the guide body 41.

FIG. 12A illustrates the state where the downstream end portion of the first belt conveyor 10 is aligned with the guide path 42d and a workpiece W0 is passing through the guide path 42d, FIG. 12B illustrates the state where the downstream end portion of the first belt conveyor 10 is aligned with the guide path 42e after the workpiece W0 has passed through the guide path 42d and the first belt conveyor 10 has been rotated in the substantially horizontal plane, FIG. 12C illustrates the state where a workpiece W1 is passing through the guide path 42e while the downstream end portion of the first belt conveyor 10 is in the state illustrated in FIG. 12B, and FIG. 12D illustrates the state where the downstream end portion of the first belt conveyor 10 is aligned with the guide path 42f after the workpiece W1 has passed through the guide path 42e and the first belt conveyor 10 has been rotated in the substantially horizontal plane.

FIG. 13A is a top view schematically illustrating the state where the workpieces W1 and W2 are spaced at an interval ds, which is shorter than a predetermined interval d, and FIG. 13B is a top view schematically illustrating the state where an air blower 110 removes the workpiece W2 that disturbs the predetermined interval d.

DETAILED DESCRIPTION

Hereinbelow, the characteristics of the present disclosure are described in detail with illustration of embodiments of the present disclosure.

First Embodiment

Referring now to FIGS. 1 to 4D, a conveying system 1 according to a first embodiment of the present disclosure is described.

Figure 1:
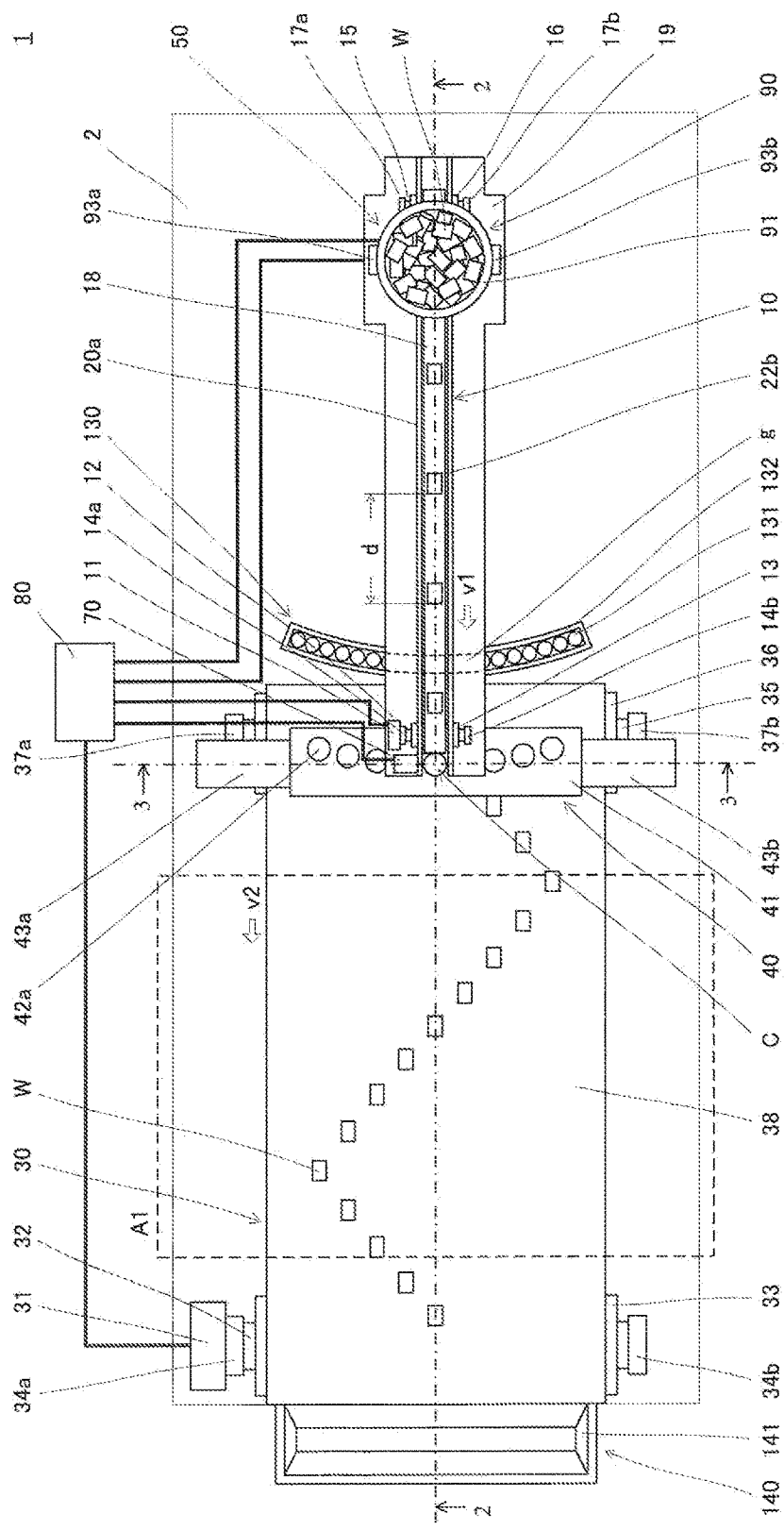
FIG. 1 is a top view of a conveying system 1 according to a first embodiment of the present disclosure.
Figure 2:
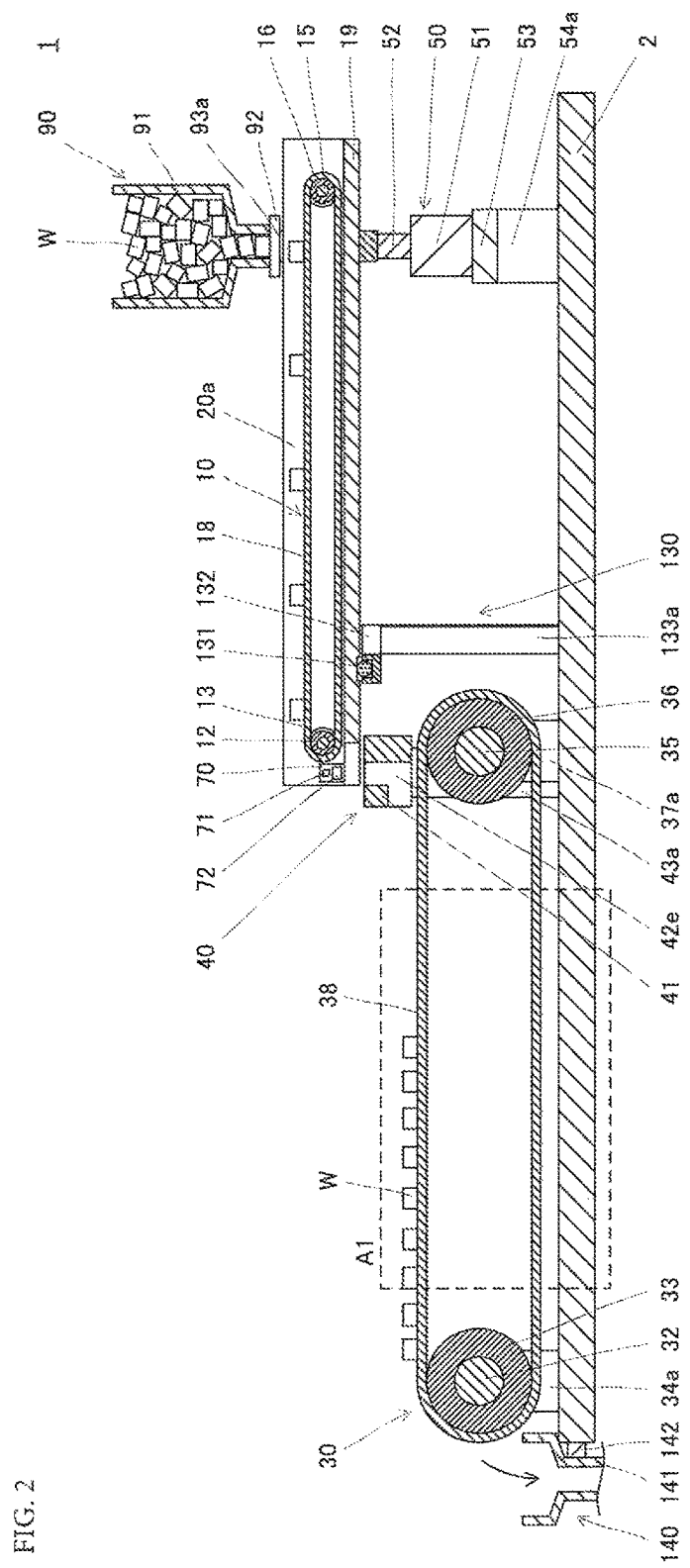
FIG. 2 is a cross-sectional view of the conveying system 1 illustrated in FIG. 1 taken along the line 2-2.
Figure 3:
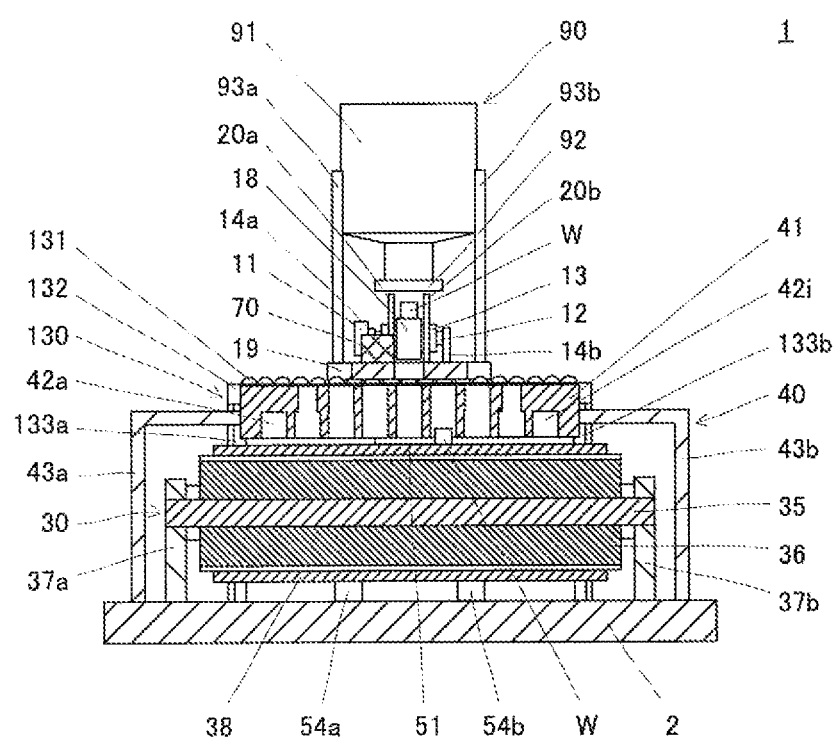
FIG. 3 is a cross-sectional view of the conveying system 1 illustrated in FIG. 1 taken along the line 3-3.

FIG. 1 is a top view of a conveying system 1 according to a first embodiment of the present disclosure. FIG. 2 is a cross-sectional view of the conveying system 1 illustrated in FIG. 1 taken along the line 2-2. FIG. 3 is a cross-sectional view of the conveying system 1 illustrated in FIG. 1 taken along the line 3-3. FIGS. 4A, 4B, 4C, and 4D are, respectively, a top view, a side view, a cross-sectional view, and a perspective view of a guide body 41 of a workpiece guide 40 included in the conveying system 1 illustrated in FIG. 1.

The conveying system 1 includes a first belt conveyor 10 and a second belt conveyor 30 that convey workpieces W, a workpiece guide 40, a rotary mechanism 50, a first sensor 70, and a controlling device 80. Preferably, the conveying system 1 further includes a part feeder 90, a guide stand 130, and a workpiece recovery mechanism 140.

Here, the first belt conveyor 10 corresponds to a first conveying mechanism of the present disclosure and the second belt conveyor 30 corresponds to a second conveying mechanism according to an embodiment of the present disclosure. The part feeder 90 corresponds to a feeding mechanism according to an embodiment of the present disclosure.

Examples of workpieces W conveyed by the conveying system 1 include a small electronic component that is substantially a rectangular parallelepiped, such as a monolithic ceramic capacitor. The conveying system 1 described below is designed in accordance with the shape and the size of the workpieces W.

In the conveying system 1 according to the first embodiment, the first belt conveyor 10, the second belt conveyor 30, the workpiece guide 40, the rotary mechanism 50, and the first sensor 70 are directly or indirectly disposed on or at the top or an end of a base 2. Similarly, the part feeder 90, the guide stand 130, and the workpiece recovery mechanism 140 are directly or indirectly disposed on or at the top or an end of the base 2. The above-described components may be disposed not only on or at the base 2, but also at different positions as appropriate. In addition, although the controlling device 80 is separately disposed, the controlling device 80 may be provided to the base 2.

First Belt Conveyor

The first belt conveyor 10 includes a first motor 11, a first driving shaft 12, a first driving pulley 13, a first driven shaft 15, a first driven pulley 16, and a first belt 18.

The first motor 11 and the first driving shaft 12 are supported by brackets 14*a* and 14*b* at the top of a subbase 19. The first driven shaft 15 is supported by brackets 17*a* and 17*b* at the top of the subbase 19. A predetermined area of a middle portion at an end portion of the subbase 19 on the downstream end side of the first belt conveyor 10 is cut out. The first belt conveyor 10 is disposed at the top of the subbase 19 in such a manner that the downstream end portion of the first belt conveyor 10 overlaps a cutout C of the subbase 19 when viewed from above.

In the first embodiment, the subbase 19 is supported at the top surface of the base 2 by the rotary mechanism 50 and the guide stand 130, which are described in detail below.

In the above-described configuration, the first motor 11 rotates the first driving pulley 13, the rotation of the first driving pulley 13 rotates the first belt 18, and the rotation of the first belt 18 rotates the first driven pulley 16. The width of the first belt 18 is so determined that the first belt 18 can convey workpieces W while the workpieces are aligned on the first belt 18.

Consequently, the first belt conveyor 10 can convey the aligned workpieces W from an upstream end portion to a downstream end portion at a first speed v1. In the case where workpieces W have a shape that has a specific orientation, the workpieces W may not be arranged in the same orientation.

In the first embodiment, the first motor 11 is connected to the controlling device 80 using a signal line and is operated by the controlling device 80 so as to move or stop. The first motor 11 may move or stop independently without being connected to the controlling device 80.

Preferably, the subbase 19 includes guide walls 20*a* and 20*b* on both sides of the first belt 18 so that the workpieces W do not fall to the sides of the first belt 18 while being conveyed from the upstream end portion to the downstream end portion of the first belt conveyor 10.

The guide walls 20*a* and 20*b* have openings at positions at which a first sensor 70 and a second sensor 100, which are described below, are disposed so as not to prevent the first sensor 70 and the second sensor 100 from capturing information. The first sensor 70 is disposed at a portion of the end portion of the subbase 19 that is not cut out.

Second Belt Conveyor

The second belt conveyor 30 includes a second motor 31, a second driving shaft 32, a second driving pulley 33, a second driven shaft 35, a second driven pulley 36, and a second belt 38.

The second motor 31 and the second driving shaft 32 are supported at the top surface of the base 2 by brackets 34*a* and 34*b*. The second driven shaft 35 is supported at the top surface of the base 2 by brackets 37*a* and 37*b*. The second belt conveyor 30 is disposed at the top surface of the base 2 in such a manner that, when viewed from above, a downstream end portion of the first belt conveyor 10 overlaps an upstream end portion of the second belt conveyor 30.

In the above-described configuration, the second motor 31 rotates the second driving pulley 33, the rotation of the second driving pulley 33 rotates the second belt 38, and the rotation of the second belt 38 rotates the second driven pulley 36. The width of the second belt 38 is so determined that workpieces W can be conveyed while being arranged in multiple lines on the second belt 38.

The second belt conveyor 30 can thus convey workpieces W arranged in multiple lines from the upstream end portion to the downstream end portion at a second speed v2.

In the first embodiment, the second motor 31 is connected to the controlling device 80 using a signal line and operated by the controlling device 80 so as to move or stop. The second motor 31 may move or stop independently without being connected to the controlling device 80.

While the workpieces W are conveyed on the second belt conveyor 30, the workpieces W are subjected to an operation such as an appearance inspection, electromagnetic wave emission, or heating in an area A1.

Workpiece Guide

Figure 4A:
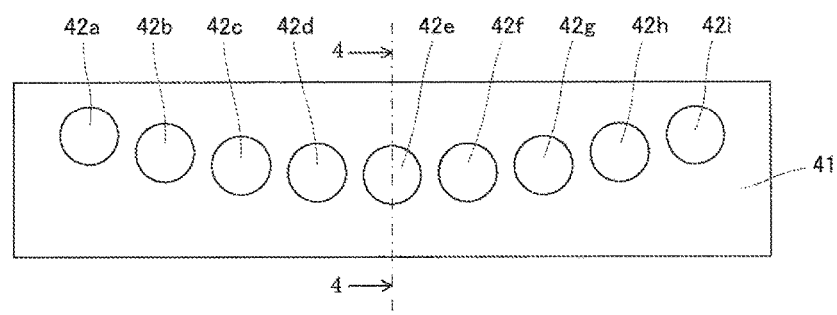
FIGS. 4A, 4B, 4C, and 4D are, respectively, a top view, a side view, a cross-sectional view, and a perspective view of a guide body 41 of a workpiece guide 40 included in the conveying system 1 illustrated in FIG. 1, where
Figure 4B:
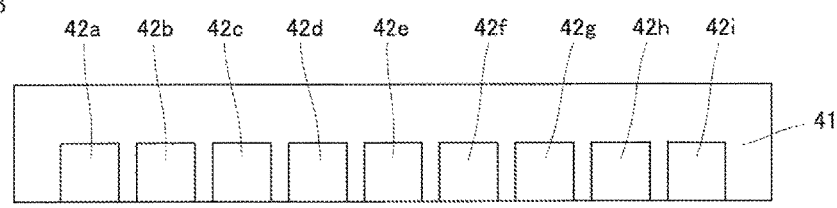

As illustrated in FIGS. 4A and 4B, the workpiece guide 40 includes a guide body 41 and multiple guide paths 42*a* to 42*i* formed in the guide body 41. The guide paths 42*a* to 42*i* each receive, one by one, the workpieces W that have fallen from the downstream end portion of the first belt conveyor 10 and then guide the workpieces W to the upstream end portion of the second belt conveyor 30.

Figure 4C:
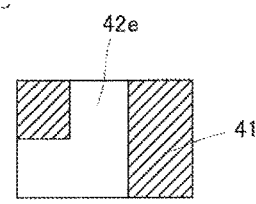

As illustrated in FIG. 4A, the guide paths 42*a* to 42*i* are arranged in a substantially arc shape at predetermined intervals so as to spread in the width direction of the second belt conveyor 30 when the guide body 41 is viewed from above. As illustrated in FIG. 4C, the guide paths 42*a* to 42*i* are bent at a substantially right angle inside the guide body 41 and pass throughout the guide body 41 so as to connect together the top surface and the bottom surface of the guide body 41 or the top surface and a side surface of the guide body 41.

Figure 4D:
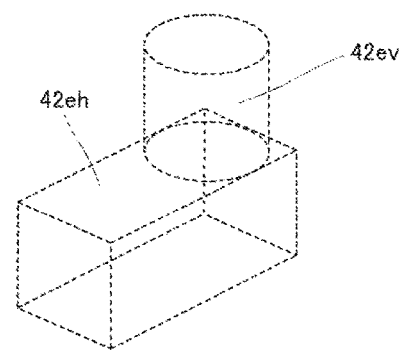

The shape of the guide paths are described taking the guide path 42*e* as an example. As illustrated in FIG. 4D, the guide path 42*e* includes a substantially vertical hole 42*ev* extending downward from the top surface of the guide body 41 and a substantially horizontal groove 42*eh* that is connected with the substantially vertical hole 42*ev* and that has openings on a side surface and the bottom surface of the guide body 41. In the first embodiment, the hole 42*ev* has a substantially cylindrical shape and the groove 42*eh* has a substantially prismatic shape.

The workpiece guide 40 is supported by brackets 43*a* and 43*b* at the top surface of the base 2 so as to be disposed between the downstream end portion of the first belt conveyor 10 and the upstream end portion of the second belt conveyor 30. As described below, the downstream end portion of the first belt conveyor 10 is displaced along the substantially arc-shaped trajectory in a substantially horizontal plane so as to be aligned with a selected one of the multiple guide paths 42a to 42i.

The above-described configuration allows a workpiece W that has fallen from the downstream end portion of the first belt conveyor 10 to pass through the selected one of the guide paths 42a to 42i and then to be transferred onto the upstream end portion of the second belt conveyor 30.

Rotary Mechanism

The rotary mechanism 50 according to the first embodiment includes a third motor 51 and a rotation shaft 52. The rotary mechanism 50 mounted on a support stand 53 is supported by the brackets 54a and 54b at the top surface of the base 2.

In the first embodiment, one end of the rotation shaft 52 is connected to the subbase 19 near the upstream end portion of the first belt conveyor 10. Specifically, the rotary mechanism 50, together with the guide stand 130 described below, supports the subbase 19 at the top surface of the base 2.

The rotary mechanism 50 is connected to the controlling device 80 using a signal line (FIG. 1 does not clearly illustrate how the rotary mechanism 50 and the controlling device 80 are connected together since the rotary mechanism 50 is not illustrated). As described below, the rotary mechanism 50 intermittently displaces the downstream end portion of the first belt conveyor 10 by a predetermined distance along the substantially arc-shaped trajectory in a substantially horizontal plane in response to an operation command transmitted from the controlling device 80 on the basis of first information.

Examples usable as the third motor 51 of the rotary mechanism 50 include a motor in which a sensor that measures an angle of rotation is installed, such as a rotary encoder.

First Sensor

The first sensor 70 detects first information that represents that a workpiece W that has been conveyed by the first belt conveyor 10 from the upstream end portion to the downstream end portion has fallen from the downstream end portion.

When a workpiece W falls from the downstream end portion of the first belt conveyor 10, the workpiece W passes through the cutout C formed in the subbase 19. As described above, the first sensor 70 is disposed at an end portion of the subbase 19 that is not cut out. Thus, the first sensor 70 can detect a workpiece W immediately before the workpiece W falls from the downstream end portion of the first belt conveyor 10 and passes through the cutout C of the subbase 19. The first sensor 70 is connected to the controlling device 80 using a signal line and transmits the first information to the controlling device 80, as described below.

Examples usable as the first sensor 70 include a reflective photoelectric sensor in which a light emitting portion 71 and a detection portion 72 are integrated. Thus, the first sensor 70 can reliably detect, without touching workpieces W, falls of the workpieces W from the downstream end portion of the first belt conveyor 10 one by one.

Another example usable as the first sensor 70 is a through-beam photoelectric sensor in which a light emitting portion 71 and a detection portion 72 are separately provided.

Controlling Device

The controlling device 80 is connected to the rotary mechanism 50 and the first sensor 70 using signal lines. The controlling device 80 receives the first information from the first sensor 70 every time a workpiece W passes. Every time the controlling device 80 receives the first information, the controlling device 80 transmits an operation command to the rotary mechanism 50 to rotate the first belt conveyor 10 so that the downstream end portion of the first belt conveyor 10 is intermittently displaced along the substantially arc-shaped trajectory by a predetermined distance.

When the first belt conveyor 10 is rotated in response to the above-described operation command, the downstream end portion of the first belt conveyor 10 is displaced along the substantially arc-shaped trajectory so as to be aligned with a selected one of the multiple guide paths 42a to 42i. Consequently, a workpiece W that has fallen from the downstream end portion of the first belt conveyor 10 passes through the selected guide path and is successfully transferred to a certain position at the upstream end portion of the second belt conveyor 30. In the above-described configuration, the controlling device 80 controls the position on the second belt conveyor 30 to which a workpiece W is conveyed.

In the first embodiment, the controlling device 80 is connected to the first motor 11 and the second motor 31 using signal lines and operates the first motor 11 and the second motor 31 so that they move and stop. The first motor 11 and the second motor 31 may move and stop without being controlled by the controlling device 80.

In the case where the conveying system 1 includes a part feeder 90, the controlling device 80 is also connected to an opening-closing mechanism 92 of the part feeder 90 using a signal line. In this case, the controlling device 80 transmits an operation command to the part feeder 90 to feed workpieces W to the first belt conveyor 10 in response to the first information transmitted from the first sensor 70. In the above-described configuration, the controlling device 80 controls feeding of workpieces W to the first belt conveyor 10.

Part Feeder

The conveying system 1 preferably includes a part feeder 90.

The part feeder 90 feeds workpieces W to the first belt conveyor 10 one by one at predetermined time intervals t, so that the workpieces W are conveyed on the first belt conveyor 10 at predetermined intervals d. The interval d is determined by the product of the time interval t at which the workpieces W are fed and the first speed v1.

The time interval t at which the workpieces W are fed is determined so as to be, for example, longer than or equal to time taken for the downstream end portion of the first belt conveyor 10 to be displaced by a distance of part of a substantially arc-shaped trajectory between one of the guide paths selected so that the downstream end portion is aligned with the guide path and a guide path adjacent to the guide path.

The part feeder 90 includes a storage tank 91 and an opening-closing mechanism 92. The storage tank 91 has a bottomed, substantially cylinder shape to hold workpieces W and the opening-closing mechanism 92 is disposed at part of a bottom portion of the storage tank 91.

In the first embodiment, the storage tank 91 is supported at the top surface of the subbase 19 by brackets 93a and 93b so as to be disposed above the first belt conveyor 10.

The opening-closing mechanism 92 is connected to the controlling device 80 using a signal line (FIG. 1 does not clearly illustrate how the opening-closing mechanism 92 is connected to the controlling device 80 since the opening-closing mechanism 92 is not illustrated). Upon receipt of an operation command transmitted from the controlling device 80 in response to the first information transmitted from the first sensor 70, the part feeder 90 feeds workpieces W to the first belt conveyor 10.

Guide Stand

The conveying system 1 preferably includes a guide stand 130.

The guide stand 130 includes a ball bearing 131 and a housing 132 that houses the ball bearing 131 in a substantially arc-shaped row. The housing 132 is supported at the top surface of the base 2 by brackets 133a and 133b. In other words, the guide stand 130, together with the above-described rotary mechanism 50, supports the subbase 19 at the top surface of the base 2.

A substantially arc-shaped groove g is formed in the bottom surface of the subbase 19. An upper portion of the substantially arc-shaped row of the ball bearing 131 is fitted into the groove g. In the above-described configuration, the subbase 19 is rotated by the rotary mechanism 50 while being supported and guided by the substantially arc-shaped row of the ball bearing 131. Consequently, the downstream end portion of the first belt conveyor 10 is smoothly displaced along the substantially arc-shaped trajectory.

Workpiece Recovery Mechanism

The conveying system 1 preferably includes a workpiece recovery mechanism 140.

The workpiece recovery mechanism 140 recovers the workpieces W that fall from the downstream end portion of the second belt conveyor 30 after being subjected to a certain operation in an area A1 while being conveyed on the second belt conveyor 30.

The workpiece recovery mechanism 140 includes a recovery pocket 141. The recovery pocket 141 has a box shape and has an opening at its bottom to transfer the recovered workpieces W to subsequent steps such as a taping step.

In the first embodiment, the recovery pocket 141 is supported at the side surface of the base 2 by a bracket 142 so as to receive the workpieces W that fall from the downstream end portion of the second belt conveyor 30.

Transfer of Workpieces from First Belt Conveyor to Second Belt Conveyor

Figure 5:
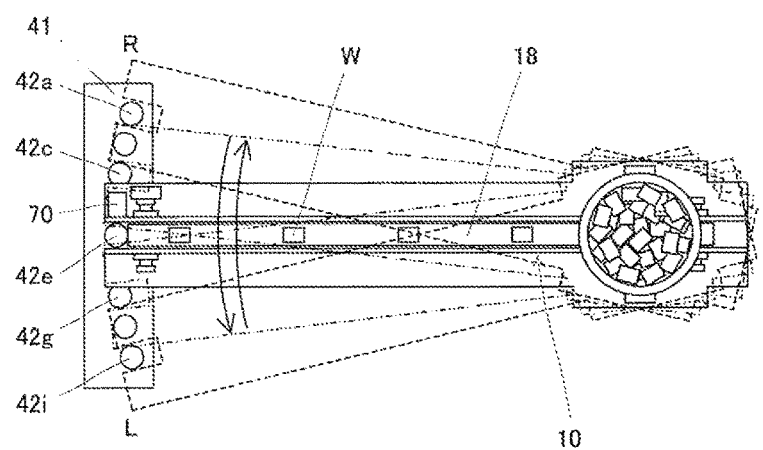
FIG. 5 is a top view of a first belt conveyor 10 included in the conveying system 1 illustrated in FIG. 1, schematically illustrating that the first belt conveyor 10 is intermittently displaced along a substantially arc-shaped trajectory so that a downstream end portion of the first belt conveyor 10 is aligned with any of the guide paths 42a to 42i.

Referring now to FIGS. 5 and 6, transfer of workpieces from the first belt conveyor 10 to the second belt conveyor 30 according to the first embodiment of the present disclosure is described.

FIG. 5 is a top view of the first belt conveyor 10 schematically illustrating that the first belt conveyor 10 is intermittently rotated around the rotation shaft 52 illustrated in FIG. 2. FIG. 5 imaginarily illustrates, with dotted lines, the position of the downstream end portion of the first belt conveyor 10 when the downstream end portion is aligned with the guide path 42a (position R) and the position of the downstream end portion when the downstream end portion is aligned with the guide path 42i (position L). As imaginarily illustrated with chain double-dashed lines, the downstream end portion of the first belt conveyor 10 is aligned with a selected one of the guide paths 42a to 42i and swings between the position R and the position L as illustrated with arrows.

FIGS. 6A to 6D are top views of the first belt conveyor 10 schematically illustrating in series that the downstream end portion of the first belt conveyor 10 is sequentially aligned with selected ones of the guide paths 42a to 42i.

The following describes the way how the intermittent rotation of the first belt conveyor 10 allows the workpieces W to pass through selected ones of the guide paths 42a to 42i and to be distributed over the second belt conveyor 30 without overlapping one another on the second belt conveyor 30.

In the first embodiment, the downstream end portion of the first belt conveyor 10 is sequentially aligned with each of guide paths 42a to 42i.

Figure 6A:
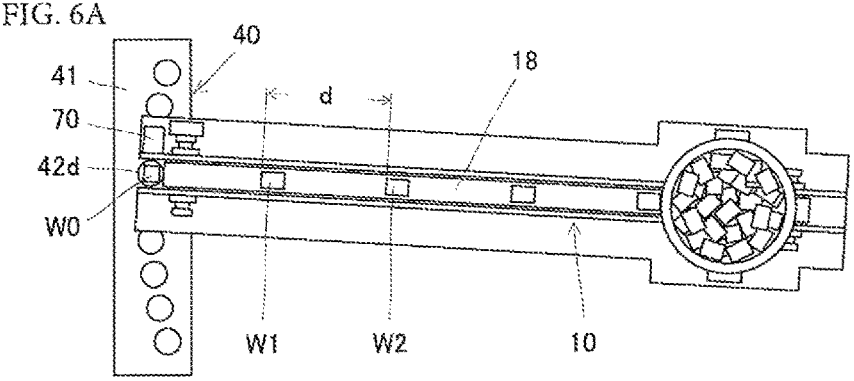
FIGS. 6A, 6B, 6C, and 6D are top views of the first belt conveyor 10 included in the conveying system 1 illustrated in FIG. 1, schematically illustrating the way the downstream end portion of the first belt conveyor 10 is aligned with any of the guide paths 42a to 42i, where

FIG. 6A illustrates the state where the downstream end portion of the first belt conveyor 10 is aligned with the guide path 42d and a workpiece W0 that has fallen from the downstream end portion of the first belt conveyor 10 is passing through the guide path 42d. On the first belt conveyor 10 (on the first belt 18), a subsequent workpiece W1 is conveyed while spaced a predetermined interval d apart from the workpiece W0 at a first speed v1.

The first sensor 70 detects that the workpiece W0 has fallen from the downstream end portion of the first belt conveyor 10 and the detection of the fall of the workpiece W0 is transmitted to the controlling device 80, illustrated in FIG. 1, as first information.

In response to the first information, the controlling device 80 transmits an operation command to the rotary mechanism 50 illustrated in FIG. 2 to rotate the first belt conveyor 10 so that the downstream end portion of the first belt conveyor 10 is displaced up to a position at which the downstream end portion is aligned with the guide path 42e.

Here, the controlling device 80 transmits the operation command to the rotary mechanism 50 a predetermined time period after receiving the first information so that the first belt conveyor 10 is rotated after the workpiece W0 has completely passed through the guide path 42d.

Figure 6B:
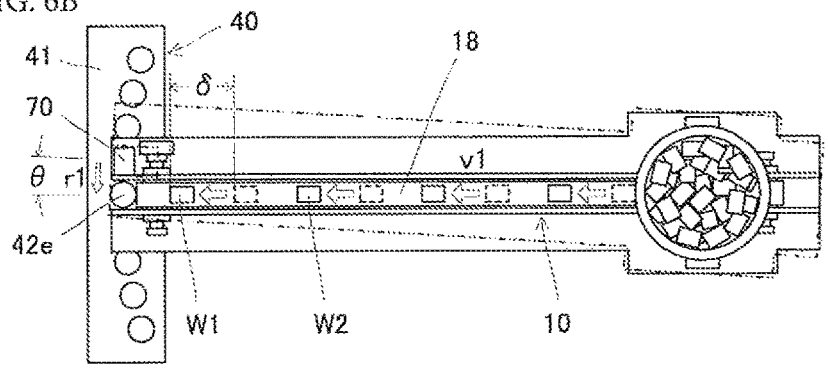

FIG. 6B illustrates the state where the rotary mechanism 50 has rotated the first belt conveyor 10 so that the downstream end portion of the first belt conveyor 10 is aligned with the guide path 42e after the workpiece W0 has passed through the guide path 42d.

In a period where the first belt conveyor 10 is changed from the state illustrated in FIG. 6A to the state illustrated in FIG. 6B, the first belt conveyor 10 is rotated by a length θ of an arc at a peripheral speed r1 of the downstream end portion. On the other hand, during the same time period, the workpiece W1 is conveyed by the first belt conveyor 10 by a distance δ at the first speed v1.

The time interval t at which the part feeder 90 feeds workpieces W is determined, for example, so as to be longer than or equal to time taken for the downstream end portion of the first belt conveyor 10 to be displaced by a length θ of an arc between adjacent guide paths. Thus, the distance δ is shorter than the interval d by which the workpiece W is conveyed.

In the above-described configuration, at the time when the downstream end portion of the first belt conveyor 10 is displaced and aligned with the guide path 42e through which the subsequent workpiece W1 is to pass, the workpiece W1 has not yet arrived at the downstream end portion of the first belt conveyor 10. In other words, the workpiece W1 arrives at the downstream end portion of the first belt conveyor 10 a predetermined time period after the downstream end portion of the first belt conveyor 10 has been aligned with the guide path 42e and then the workpiece W1 falls off through the guide path 42e.

Figure 6C:
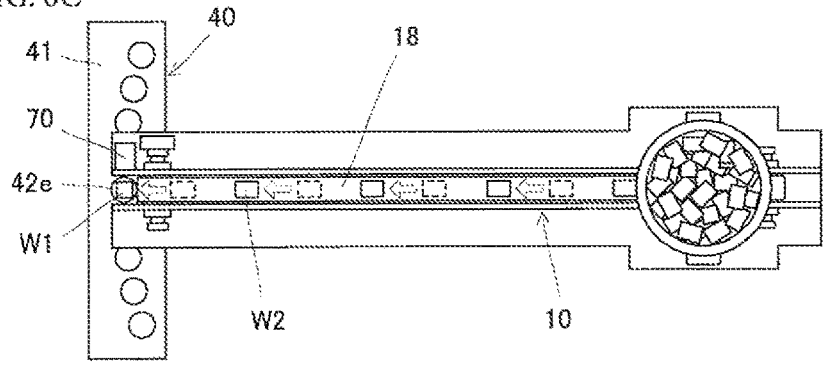

FIG. 6C illustrates the state where the workpiece W1 is passing through the guide path 42e after the first belt conveyor 10 has been changed into the state illustrated in FIG. 6B. On the first belt conveyor 10, a subsequent workpiece W2 is conveyed while spaced at a predetermined interval d apart from the workpiece W1 at the first speed v1.

As in the case illustrated in FIG. 6A, the first sensor 70 detects that the workpiece W1 has fallen from the downstream end portion of the first belt conveyor 10 and the detection of the fall of the workpiece W1 is transmitted to the controlling device 80, illustrated in FIG. 1, as first information.

In response to the first information, the controlling device 80 transmits an operation command to the rotary mechanism 50 illustrated in FIG. 2 to rotate the first belt conveyor 10 so that the downstream end portion of the first belt conveyor 10 is displaced up to a position at which the downstream end portion is aligned with the guide path 42f.

Figure 6D:
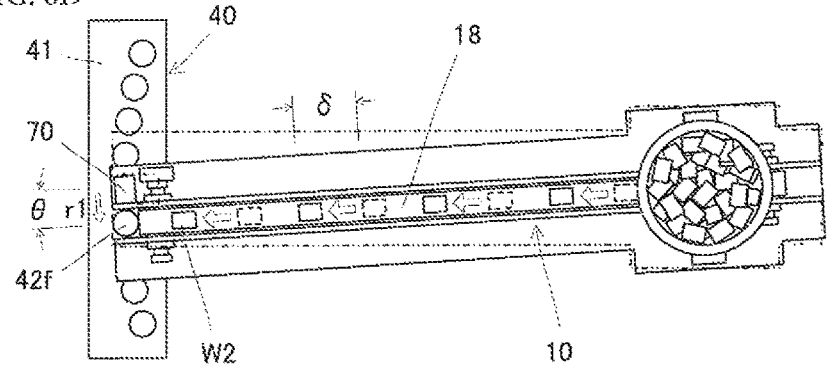

FIG. 6D illustrates the state where the rotary mechanism 50 has rotated the first belt conveyor 10 so that the downstream end portion of the first belt conveyor 10 is aligned with the guide path 42f after the workpiece W1 has passed through the guide path 42e.

As in the case illustrated in FIG. 6B, in a period where the first belt conveyor 10 is changed from the state illustrated in FIG. 6C to the state illustrated in FIG. 6D, the first belt conveyor 10 is rotated by a length θ of an arc at a peripheral speed r1 of the downstream end portion. On the other hand, during the same time period, the workpiece W2 is conveyed by the first belt conveyor 10 by a distance δ at the first speed v1.

Then, the workpiece W2 arrives at the downstream end portion of the first belt conveyor 10 a predetermined time period after the downstream end portion of the first belt conveyor 10 has been aligned with the guide path 42f through which the workpiece W2 is to pass and then the workpiece W2 falls off through the guide path 42f.

The controlling device 80 repeatedly transmits the operation command to the rotary mechanism 50 in response to the first information. When a workpiece W has passed through the guide path 42a or 42i, the controlling device 80 transmits an operation command to the rotary mechanism 50 so as to change the rotation direction of the first belt conveyor 10 to a direction opposite to the direction of the previous rotation.

Thus, the first belt conveyor 10 is intermittently rotated around the rotation shaft 52 illustrated in FIG. 2. As illustrated in FIG. 5, the downstream end portion is displaced along the substantially arc-shaped trajectory so as to be sequentially aligned with the guide paths 42a to 42i.

As a result of the above-described operations, workpieces W that have fallen from the downstream end portion of the first belt conveyor 10 are sequentially distributed one by one into the guide paths 42a to 42i of the workpiece guide 40.

Consequently, each workpiece W that has fallen from the downstream end portion of the first belt conveyor 10 passes through one of the guide paths 42a to 42i of the workpiece guide 40 and is then transferred to a certain position at the upstream end portion of the second belt conveyor 30.

By the time when a subsequent workpiece W falls, the first belt conveyor 10 has been rotated rightward or leftward by a distance equivalent to one guide path. Thus, when the workpiece falls, the subsequent workpiece W passes through a guide path adjacent to the guide path through which the previous workpiece W has passed. The subsequent workpiece W is then transferred to a position at the upstream end portion of the second belt conveyor 30, the position being different in the direction perpendicular to the conveyance direction of the workpiece W from the position to which the previous workpiece W has been transferred.

With the above-described control and operations, the controlling device 80 controls the position on the second belt conveyor 30 to which each workpiece W is transferred.

In this manner, the conveying system 1 according to the first embodiment having the above-described system configuration distributes the workpieces W in such a manner that the workpieces W do not overlap one another on the second belt conveyor 30. In other words, while the workpieces W are conveyed on the second belt conveyor 30, the workpieces W can be efficiently subjected to a certain operation without causing defects due to overlapping of the workpieces W.

The conveying system 1 according to an embodiment of the present disclosure may be intermittently displaced along the substantially arc-shaped trajectory while the downstream end portion of the first belt conveyor 10 is aligned with one out of every few guide paths of the guide paths 42a to 42i of the workpiece guide 40.

For example, in the case where the first belt conveyor 10 is aligned with one out of every other guide path of the guide paths 42a to 42i, the downstream end portion of the first belt conveyor 10 is intermittently displaced while being sequentially aligned with the guide paths 42a, 42c, 42e, 42g, and 42i. In this case, the intervals between the workpieces W in the conveyance direction and the width direction can be sufficiently widened.

Thus, when the conveying system 1 according to this embodiment of the present disclosure is employed in a screening system that inspects the appearance of workpieces W during conveyance using devices such as a camera, each workpiece W can be reliably detected.

Second Embodiment

Referring now to FIGS. 7 to 10D, a conveying system 1 according to a second embodiment of the present disclosure is described.

Figure 7:
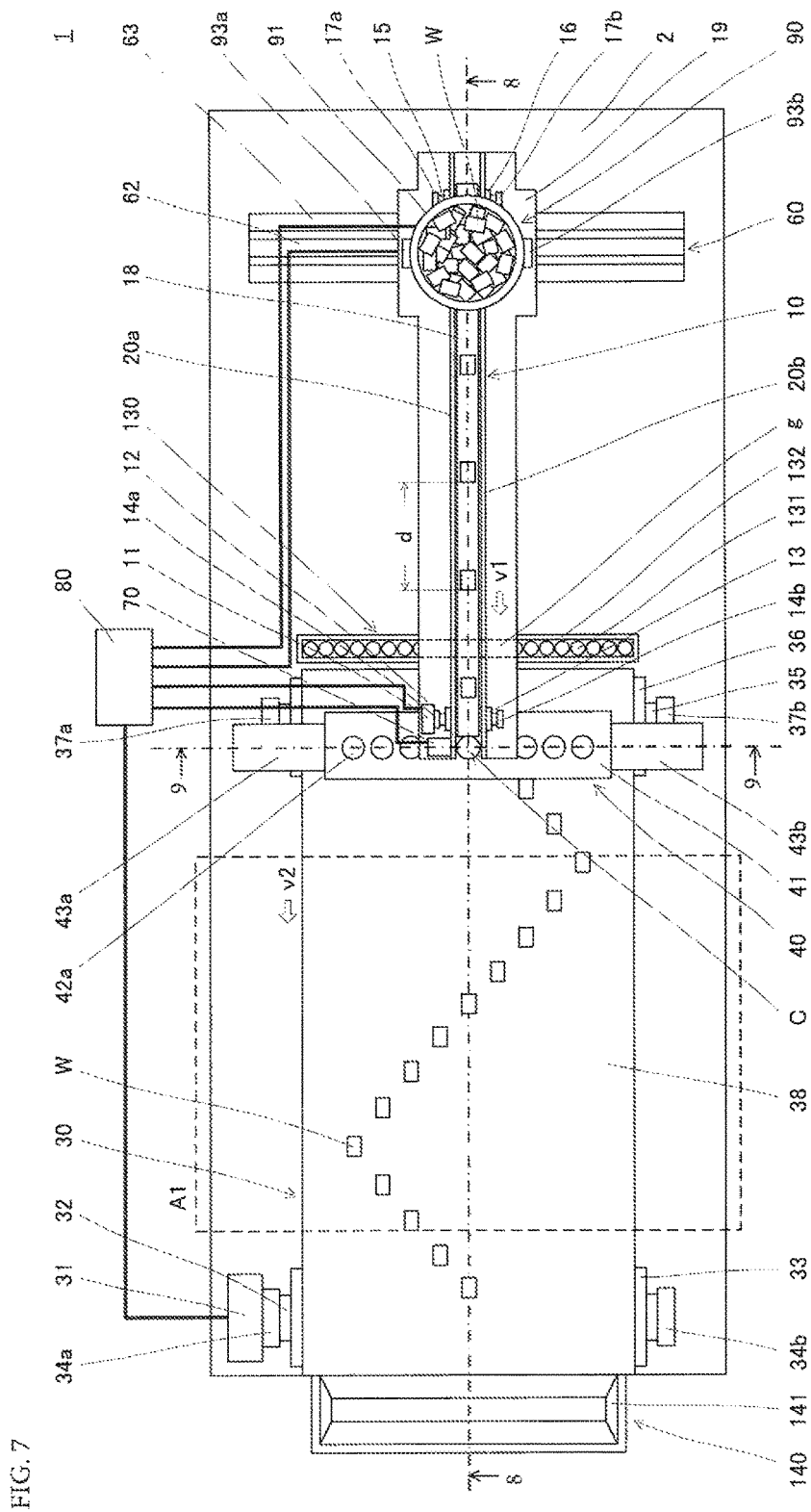
FIG. 7 is a top view of a conveying system 1 according to a second embodiment of the present disclosure.
Figure 8:
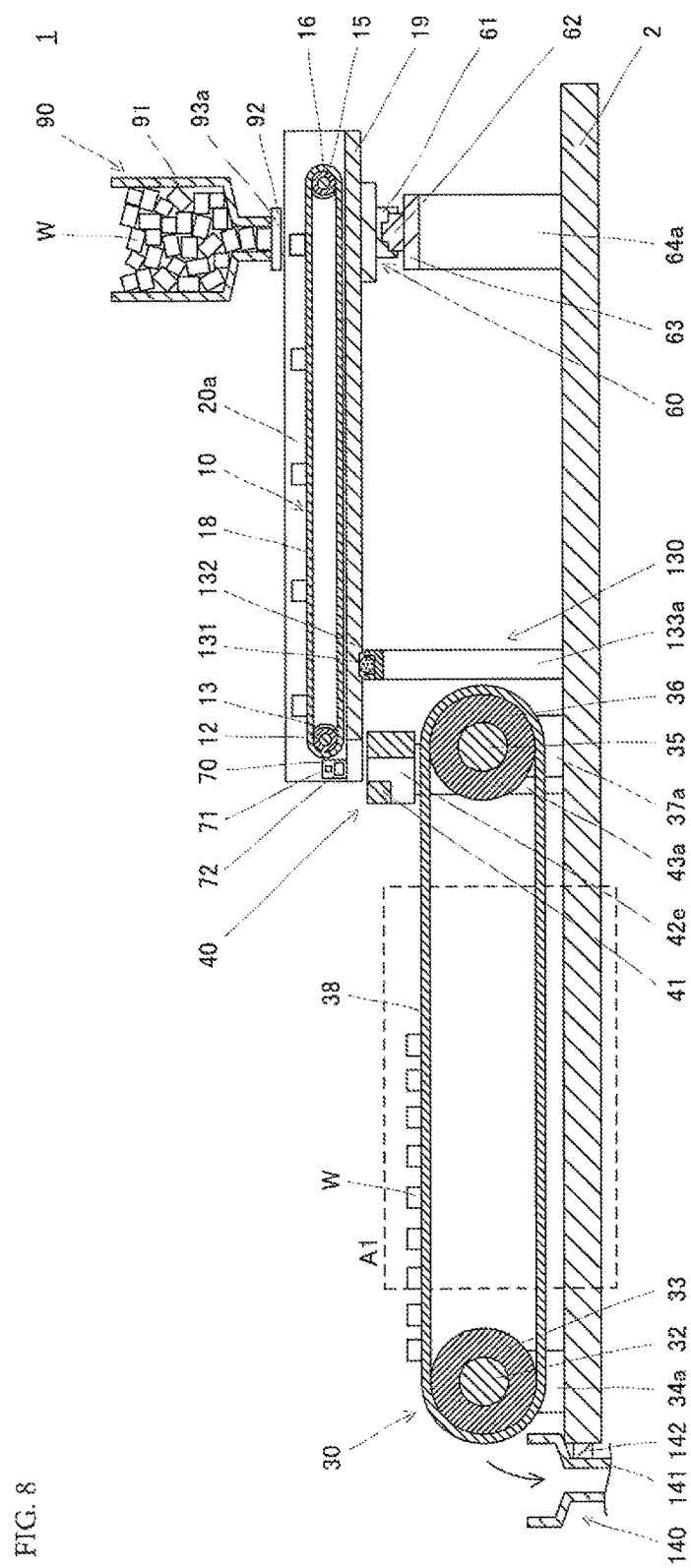
FIG. 8 is a cross-sectional view of the conveying system 1 illustrated in FIG. 7 taken along the line 8-8.
Figure 9:
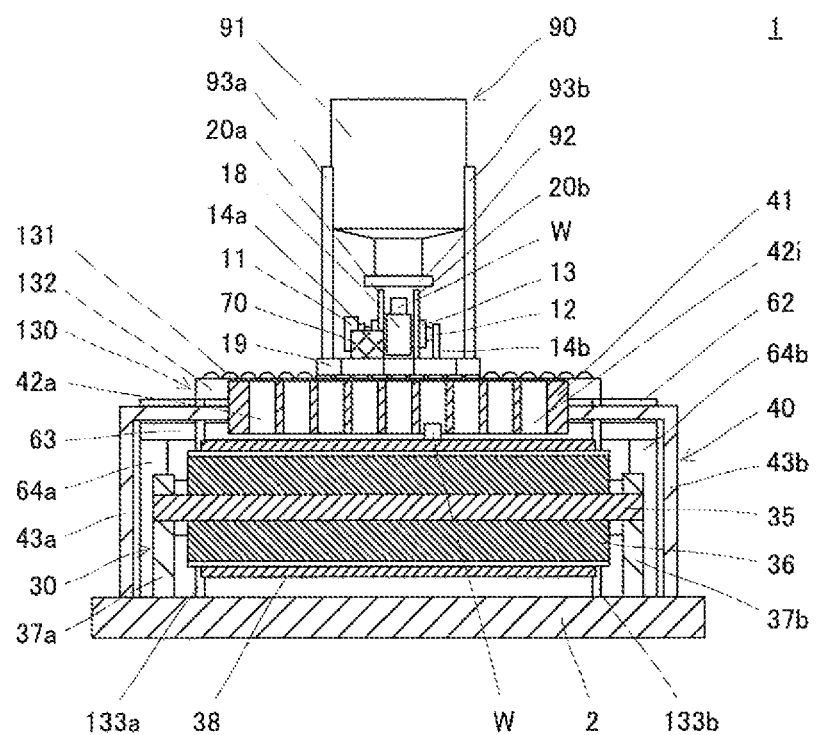
FIG. 9 is a cross-sectional view of the conveying system 1 illustrated in FIG. 7 taken along the line 9-9.

FIG. 7 is a top view of a conveying system 1 according to a second embodiment of the present disclosure. FIG. 8 is a cross-sectional view of the conveying system 1 illustrated in FIG. 7 taken along the line 8-8. FIG. 9 is a cross-sectional view of the conveying system 1 illustrated in FIG. 7 taken along the line 9-9. FIGS. 10A, 10B, 10C, and 10D are, respectively, a top view, a side view, a cross-sectional view, and a perspective view of a guide body 41 of a workpiece guide 40 included in the conveying system 1 illustrated in FIG. 7.

The conveying system 1 according to the second embodiment is different from the conveying system 1 according to the first embodiment in terms of, among the components described in the first embodiment, the workpiece guide 40, a linear motion mechanism 60, and a guide stand 130. Other components are the same as those according to the first embodiment and thus not described.

Workpiece Guide

The workpiece guide 40 includes a guide body 41 and multiple guide paths 42a to 42i formed in the guide body 41. The position at which and the way the guide body 41 is disposed are the same as those in the case of the guide body 41 according to the first embodiment and thus are not described here.

Figure 10A:
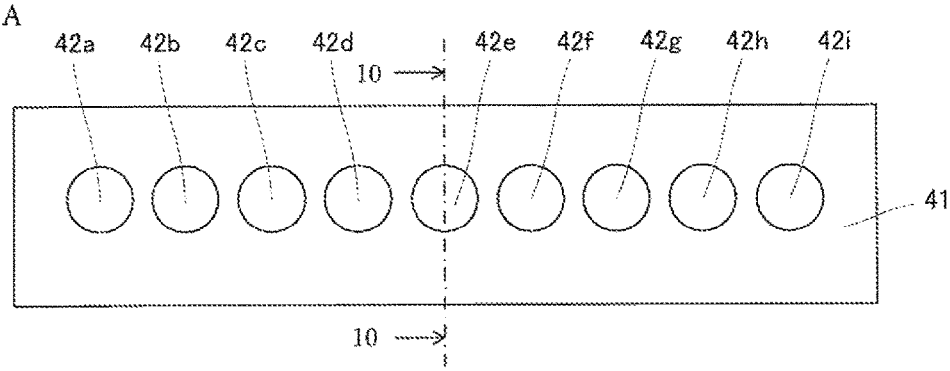
FIGS. 10A, 10B, 10C, and 10D are, respectively, a top view, a side view, a cross-sectional view, and a perspective view of a guide body 41 of a workpiece guide 40 included in the conveying system 1 illustrated in FIG. 7, where
Figure 10B:
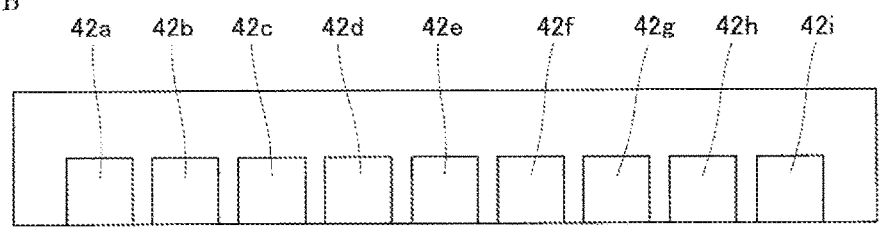
Figure 10C:
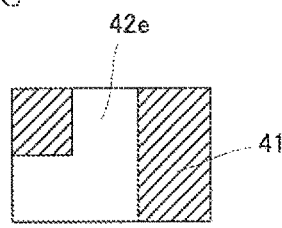
Figure 10D:
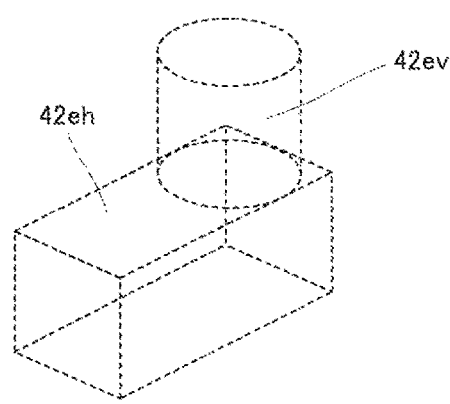

As illustrated in FIG. 10A, the guide paths 42a to 42i are arranged in a straight line at predetermined intervals when the guide body 41 is viewed from above. As illustrated in FIGS. 10B to 10D, the form of the guide paths 42a to 42i is the same as that in the case of the guide paths according to the first embodiment and thus not described.

Linear Motion Mechanism

The linear motion mechanism 60 according to the second embodiment includes a movable portion 61 and a fixed portion 62. The movable portion 61 linearly moves over the fixed portion 62. The linear motion mechanism 60 mounted on the support stand 63 is supported by brackets 64a and 64b at the top surface of the base 2.

In the second embodiment, the movable portion 61 is coupled with the subbase 19 at a position near the upstream end portion of the first belt conveyor 10. In other words, the linear motion mechanism 60, together with a guide stand 130 described below, supports the subbase 19 at the top surface of the base 2.

The movable portion 61 is connected to the controlling device 80 using a signal line (In FIG. 1 the movable portion 61 is not illustrated). As described below, the movable portion 61 intermittently translates the downstream end portion of the first belt conveyor 10 in the substantially horizontal plane by a predetermined distance in response to the first information in response to an operation command transmitted from the controlling device 80.

Examples usable as the linear motion mechanism 60 include a linear motor in which a linear encoder is installed.
Guide Stand As in the case of the conveying system 1 according to the first embodiment, the conveying system 1 according to the second embodiment preferably includes a guide stand 130.

The guide stand 130 includes a ball bearing 131 and a housing 132 that houses the ball bearing 131 in a straight row. The housing 132 is supported in the same manner as in the case of the housing 132 according to the first embodiment.

Figure 11:
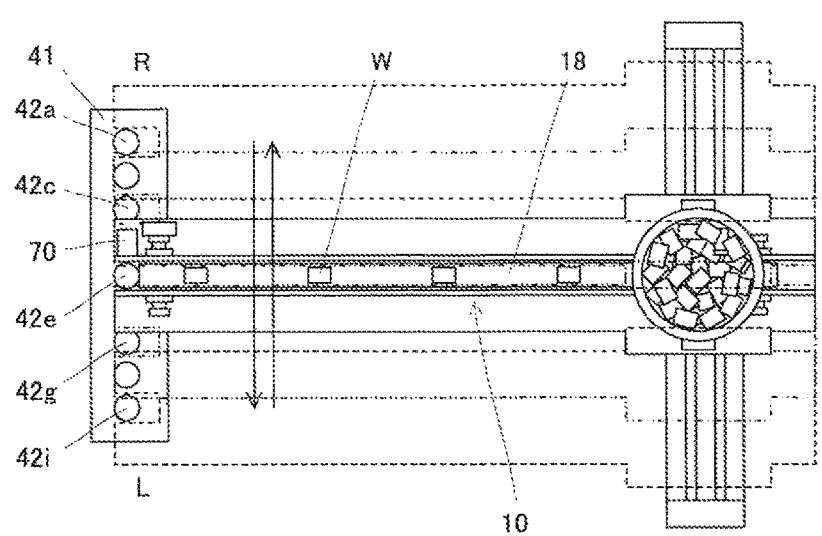
FIG. 11 is a top view of a first belt conveyor 10 included in the conveying system 1 illustrated in FIG. 7, schematically illustrating that the first belt conveyor 10 is intermittently translated so that the downstream end portion of the first belt conveyor 10 is aligned with any of the guide paths 42a to 42i.
Figure 12A:
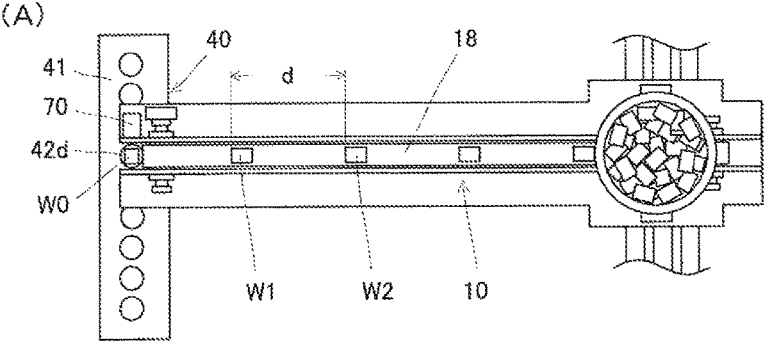
FIGS. 12A, 12B, 12C, and 12D are top views of the first belt conveyor 10 included in the conveying system 1 illustrated in FIG. 7, schematically illustrating that the downstream end portion of the first belt conveyor 10 is aligned with any of the guide paths 42a to 42i, where
Figure 12B:
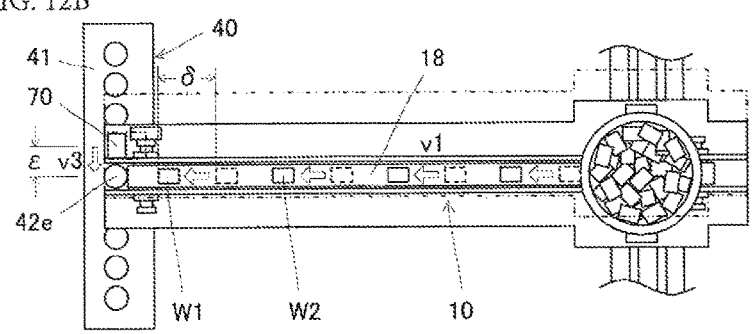
Figure 12C:
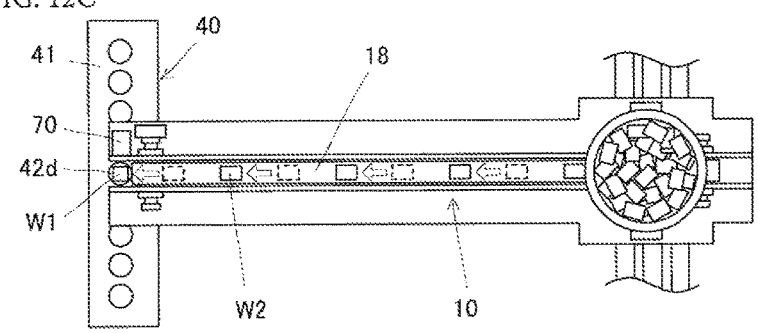
Figure 12D:
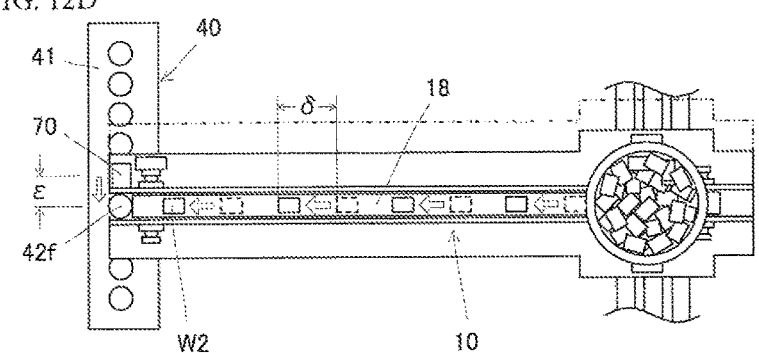

A straight groove g is formed in the bottom surface of the subbase 19. An upper portion of the straight row of the ball bearing 131 is fitted into the groove g. In the above-described configuration, the subbase 19 is translated by the linear motion mechanism 60 while being supported and guided by the straight row of the ball bearing 131. Consequently, the downstream end portion of the first belt conveyor 10 is smoothly displaced along the straight trajectory.
Transfer of Workpieces from First Belt Conveyor to Second Belt Conveyor Referring now to FIGS. 11 to 12D, transfer of workpieces from the first belt conveyor 10 to the second belt conveyor 30 according to the second embodiment of the present disclosure will be described. FIGS. 11 to 12D correspond to FIGS. 5 and 6 that illustrate transfer of workpieces from the first belt conveyor 10 to the second belt conveyor 30 according to the first embodiment.

FIG. 11 is a top view of the first belt conveyor 10 schematically illustrating that the first belt conveyor 10 is intermittently translated as a result of the movable portion 61 of the linear motion mechanism 60 linearly moving over the fixed portion 62. FIG. 11 imaginarily illustrates, with dotted lines, the position of the downstream end portion of the first belt conveyor 10 when the downstream end portion is aligned with the guide path 42a (position R) and the position of the downstream end portion when the downstream end portion is aligned with the guide path 42i (position L). As imaginarily illustrated in FIG. 11 with chain double-dashed lines, the downstream end portion of the first belt conveyor 10 is aligned with a selected one of the guide paths 42a to 42i and swings between the position R and the position L as illustrated with the arrows.

FIGS. 12A to 12D are top views schematically illustrating, in sequence, the way how the downstream end portion of the first belt conveyor 10 is sequentially aligned with a selected one of the guide paths 42a to 42i. Also in the second embodiment, the downstream end portion of the first belt conveyor 10 is assumed to be sequentially aligned with the guide paths 42a to 42i.

Transfer of workpieces W from the first belt conveyor 10 to the second belt conveyor 30 according to the second embodiment of the present disclosure is described as an operation performed by the linear motion mechanism 60 instead of the rotary mechanism 50 according to the first embodiment.

The controlling device 80 repeatedly transmits an operation command to the movable portion 61 of the linear motion mechanism 60 in response to the first information. When a workpiece W has passed through the guide path 42a or 42i, the controlling device 80 transmits an operation command to the movable portion 61 so as to change the translation direction of the first belt conveyor 10 to a direction opposite to the direction of the previous translation.

Thus, the first belt conveyor 10 is intermittently translated over the fixed portion 62. As illustrated in FIG. 11, the downstream end portion is translated so as to be sequentially aligned with the guide paths 42a to 42i.

As a result of the above-described operations, workpieces W that have fallen from the downstream end portion of the first belt conveyor 10 are distributed one by one into the respective guide paths 42a to 42i of the workpiece guide 40.

As in the case of the conveying system 1 according to the first embodiment, the conveying system 1 according to the second embodiment also distributes the workpieces W in such a manner that the workpieces W do not overlap one another on the second belt conveyor 30. In other words, while the workpieces W are conveyed on the second belt conveyor 30, the workpieces W can be efficiently subjected to a certain operation without causing defects due to overlapping of the workpieces W.

Third Embodiment

Figure 13A:
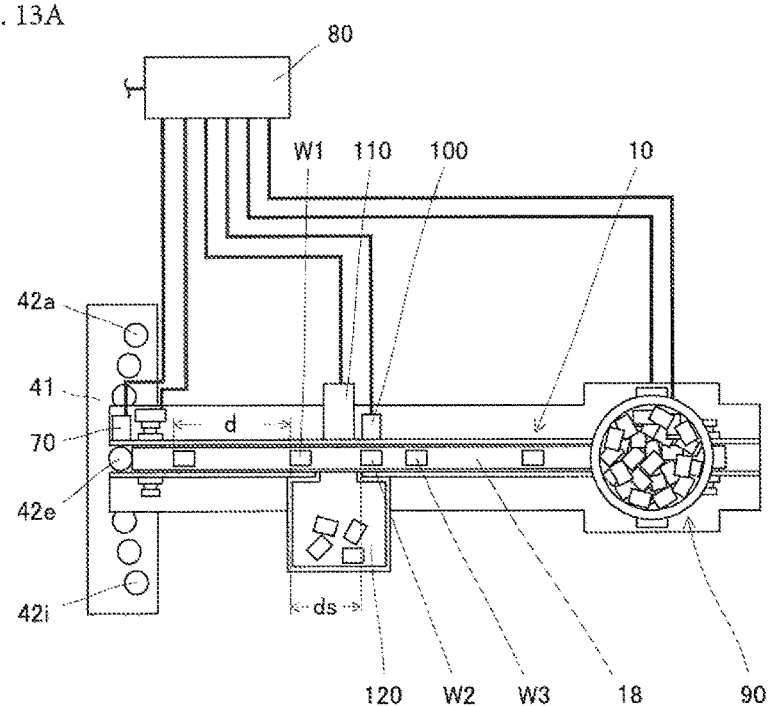
FIGS. 13A and 13B are top views of a main portion of a conveying system 1 according to a third embodiment of the present disclosure, where
Figure 13B:
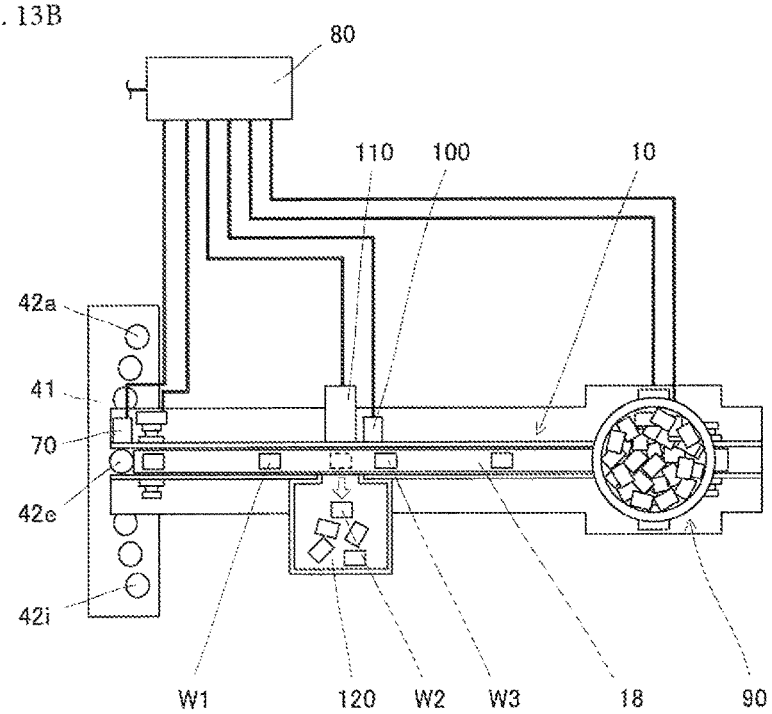

Referring now to FIGS. 13A and 13B, a main portion of a conveying system 1 according to a third embodiment of the present disclosure is described. Other portions of the conveying system 1 are the same as those in the case of the first embodiment and thus not described.

FIGS. 13A and 13B are top views of a main portion of the conveying system 1 according to the third embodiment of the present disclosure, schematically and sequentially illustrating the operations of the conveying system 1 performed when intervals between workpieces W fed from the part feeder 90 are out of a predetermined interval d.

In addition to the components described in the first embodiment, the conveying system 1 according to the third embodiment further includes a second sensor 100, an air blower 110, and a removed-workpiece recovery box 120. Here, the air blower 110 corresponds to a removal mechanism in the present disclosure.
Second Sensor The second sensor 100 detects second information that represents that a workpiece W has passed through a predetermined position between the upstream end and the downstream end of the first belt conveyor 10. The second sensor 100 is disposed on the subbase 19 near the first belt 18 at such a position as to be capable of detecting passage of a workpiece W conveyed by the first belt conveyor 10.

As in the case of the first sensor 70, examples usable as the second sensor 100 include a reflective photoelectric sensor in which a light emitting portion and a detection portion (not illustrated) are integrated. Thus, the second sensor 100 can reliably detect conveyance of the workpieces W from the upstream end to the downstream end of the first belt conveyor 10 one by one in a noncontact manner.

Another example usable as the second sensor 100 is a through-beam photoelectric sensor in which a light emitting portion and a detection portion are separately provided.

Air Blower

The air blower 110 is configured to be capable of removing a desired workpiece W on the first belt conveyor 10. The air blower 110 includes, for example, a compressor and a nozzle from which a jet of air compressed by the compressor is blown on a target object (the compressor and the nozzle are not illustrated). Thus, target workpieces W can be reliably removed one by one in a non-contact manner. The removed workpieces W are recovered by the removed-workpiece recovery box 120.

Operation of Air Blower

The following describes that intervals between conveyed workpieces W are further reliably kept to be larger than or equal to a predetermined interval d by operating the air blower 110 when the intervals between fed workpieces W are out of the predetermined interval d.

As described above, the part feeder 90 feeds workpieces W at predetermined time intervals t so that the intervals between adjacent workpieces W on the first belt conveyor 10 fall within a predetermined interval d. The second sensor 100 detects that a workpiece W has passed a predetermined position on the first belt conveyor 10 and transmits the detection of the passage of the workpiece W as second information to the controlling device 80.

The controlling device 80 records the time of detection of second information transmitted from the second sensor 100 every time when a workpiece W passes the predetermined position. The time intervals at which the second information is transmitted by the second sensor 100 serve as an index of the intervals between workpieces W on the first belt conveyor 10. The controlling device 80 compares a time interval between adjacent times of transmission of the second information and a predetermined time interval determined in advance in accordance with the predetermined interval d and determines whether the intervals between adjacent workpieces W on the first belt conveyor 10 are normal or not.

Here, attention is paid to a workpiece W1 and a workpiece W2 conveyed by the first belt conveyor 10. Normally, the workpiece W1 and the workpiece W2 are conveyed while spaced at a predetermined interval d apart from each other as described above.

As illustrated in FIG. 13A, however, for some reason, the interval between the workpiece W1 and the workpiece W2 is changed to an interval ds, which is shorter than the predetermined interval d.

In such a case, the time interval between the time when the workpiece W1 has passed a predetermined position (first detection time) and the time when the subsequent workpiece W2 has passed the predetermined position (second detection time) becomes shorter than the time interval determined in advance in accordance with the interval d.

When the controlling device 80 determines that the time interval between adjacent times of transmission of the second information is shorter than the predetermined time interval, the controlling device 80 transmits an operation command to the air blower 110 to remove the workpiece W2 that has passed the predetermined position at the second detection time.

In response to the operation command, the air blower 110 removes the workpiece W2 from the first belt conveyor 10 by blowing a jet of air on the workpiece W2 as illustrated in FIG. 13B.

Consequently, the interval between the workpiece W1 and a workpiece W3 that has followed the workpiece W2 that has been removed from the first belt conveyor 10 reliably falls within a predetermined interval d or longer.

In this manner, the controlling device 80 adjusts the intervals between workpieces W on the first belt conveyor 10.

In the conveying system 1 according to the third embodiment, a period after a certain workpiece W has passed through a certain guide path until a subsequent workpiece W arrives at the downstream end portion of the first belt conveyor 10 is sufficient for the downstream end portion of the first belt conveyor 10 to be displaced either leftward or rightward by a predetermined distance.

Thus, a workpiece W that is to fall after the certain workpiece W has fallen reliably passes through a guide path that is a predetermined distance apart from the guide path through which the previous workpiece W has passed. In other words, workpieces W are further reliably transferred to positions at the upstream end portion of the second belt conveyor 30, the positions being different in the direction perpendicular to the conveyance direction of the workpieces W from the position to which the previous workpiece W has been transferred.

Fourth to Seventh Embodiments

Referring now to FIGS. 14 to 17, guide paths 42a to 42i included in the workpiece guide 40 according to first to fourth modified examples are described as guide paths according to fourth to seventh embodiments of the present disclosure. Other portions of the conveying device are the same as those of the conveying device according to the first embodiment and thus not described.

Figure 14:
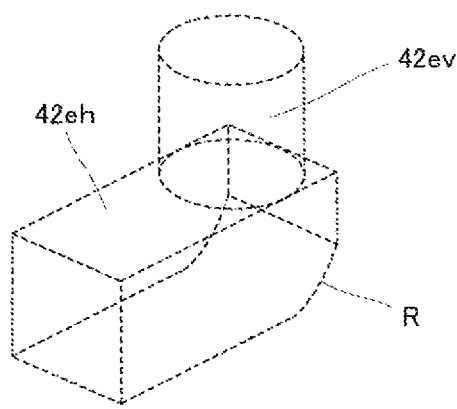
FIG. 14 is a perspective view of a first modified example of the guide path 42e representing guide paths 42a to 42i of a workpiece guide 40 according to a fourth embodiment of the present disclosure.
Figure 15:
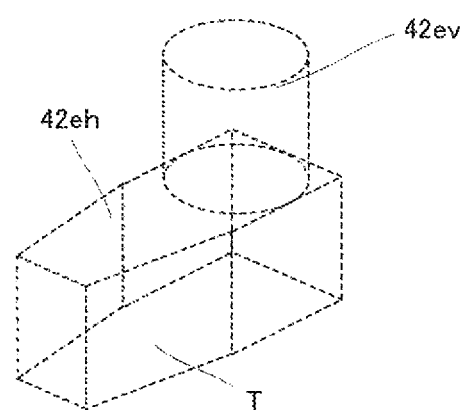
FIG. 15 is a perspective view of a second modified example of the guide path 42e of a workpiece guide 40 according to a fifth embodiment of the present disclosure.
Figure 16:
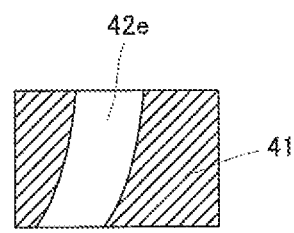
FIG. 16 is a cross-sectional view of a third modified example of the guide path 42e of a workpiece guide 40 according to a sixth embodiment of the present disclosure.
Figure 17:
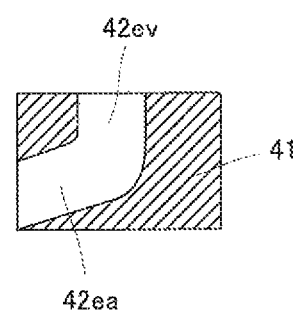
FIG. 17 is a cross-sectional view of a fourth modified example of the guide path 42e of a workpiece guide 40 according to a seventh embodiment of the present disclosure.
Figure 18:
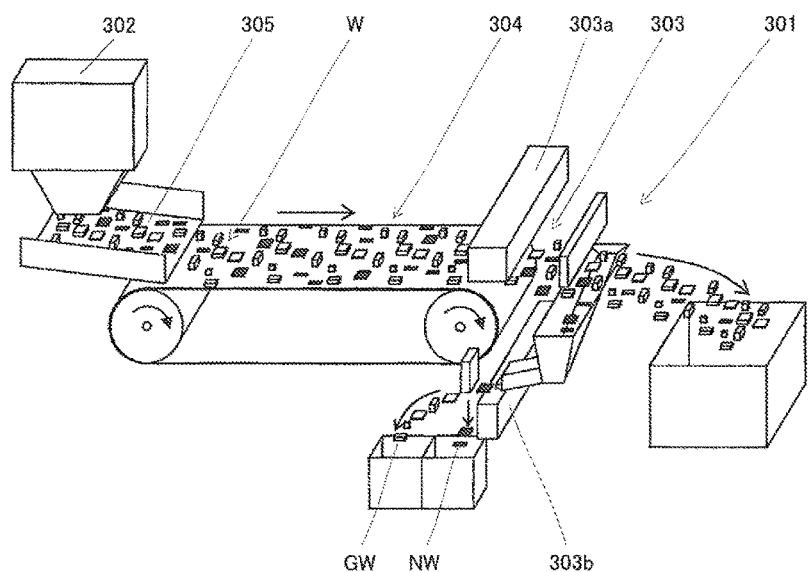
FIG. 18 is a configuration diagram of a screening system 301 including a conveying system according to an existing technology.

FIG. 14 is a perspective view of a first modified example of the guide path 42e representing the guide paths 42a to 42i. FIG. 15 is a perspective view of a second modified example of the guide path 42e. FIG. 16 is a cross-sectional view of a third modified example of the guide path 42e. FIG. 17 is a cross-sectional view of a fourth modified example of the guide path 42e.

A first modified example of the guide path 42e illustrated in FIG. 14 is formed by curving part of a substantially horizontal groove 42eh that has openings on a side surface and the bottom surface of the guide body 41 so as to have a curved surface R.

In this case, a workpiece W that has fallen from the downstream end portion of the first belt conveyor 10 and passed through the substantially vertical hole 42ev impacts the curved surface R, gradually changes its direction so as to follow the shape of the curved surface R, and is then smoothly transferred onto the upstream end portion of the second belt conveyor 30.

This configuration prevents the workpieces W from jumping when the workpieces W are transferred onto the second belt conveyor 30. Thus, the workpieces W are transferred to stable positions and neatly conveyed on the second belt conveyor 30, whereby the workpieces W are efficiently subjected to operations in the area A1.

A second modified example of the guide path 42e illustrated in FIG. 15 is formed by tapering part of the substantially horizontal groove 42eh that has openings on a side surface and the bottom surface of the guide body 41 so as to have a tapered portion T.

In the case where workpieces W have a shape that has a lengthwise direction and a widthwise direction, the workpieces W that have fallen from the downstream end portion of the first belt conveyor 10 are oriented in the lengthwise direction at the tapered portion T and transferred onto the upstream end portion of the second belt conveyor 30.

In other words, since the workpieces W are conveyed while being oriented in the lengthwise direction, the workpieces are efficiently subjected to operations such as an appearance inspection in the area A1.

A third modified example of the guide path 42e illustrated in FIG. 16 is formed by forming a single hole that is gently curved as a whole without dividing the guide path 42e into the substantially vertical hole and the substantially horizontal groove and that passes throughout the guide body 41 only between the top surface and the bottom surface of the guide body 41.

As in the case of the first modified example, in this case, the workpiece W that has fallen from the downstream end portion of the first belt conveyor 10 gradually changes its direction so as to follow the shape of the gently curved guide path 42e and is then smoothly transferred onto the upstream end portion of the second belt conveyor 30.

As in the case of the first modified example, this configuration prevents the workpieces W from jumping when the workpieces W are transferred onto the second belt conveyor 30. In other words, the workpieces W are transferred to stable positions and neatly conveyed on the second belt conveyor 30, whereby the workpieces W are efficiently subjected to operations in the area A1.

A fourth modified example of the guide path 42e illustrated in FIG. 17 is formed so as to include a substantially vertical hole 42ev and an oblique hole 42ea and so that the guide path passes throughout the guide body 41 only between the top surface and a side surface of the guide body 41.

In this case, the workpiece W that has fallen from the downstream end portion of the first belt conveyor 10 changes its direction at the oblique hole 42ea, slides through the hole 42ea, and is then transferred onto the upstream end portion of the second belt conveyor 30.

As in the case of the first modified example, this configuration prevents the workpieces W from jumping when the workpieces W are transferred onto the second belt conveyor 30. In other words, the workpieces W are transferred to stable positions and neatly conveyed on the second belt conveyor 30, whereby the workpieces W are efficiently subjected to operations in the area A1.

As described above, the first to fourth modified examples of the guide paths 42a to 42i enable the position or the orientation of the workpieces W on the second belt conveyor 30 to be further neatly adjusted.

The present disclosure is not limited to the above-described embodiments and may be applied to various other situations or modified in various manners within the scope of the disclosure.

While preferred embodiments of the disclosure have been described above, it is to be understood that variations and modified examples will be apparent to those skilled in the art without departing from the scope and spirit of the disclosure. The scope of the disclosure, therefore, is to be determined solely by the following claims.

What is claimed is:

1. A conveying system, comprising:
a first conveying mechanism that conveys a plurality of workpieces while keeping the workpieces in a row;
a second conveying mechanism that conveys the workpieces that have finished being conveyed by the first conveying mechanism, the second conveying mechanism having a width that allows the workpieces to be conveyed in a plurality of rows;
a workpiece guide disposed between a downstream end portion of the first conveying mechanism and an upstream end portion of the second conveying mechanism, the workpiece guide including a plurality of guide paths distributed in a widthwise direction of the second conveying mechanism, the guide paths receiving the workpieces that have fallen from the downstream end portion of the first conveying mechanism one by one and then guiding the workpieces to the upstream end portion of the second conveying mechanism;
a displacement mechanism that displaces the downstream end portion of the first conveying mechanism within a range within which the plurality of guide paths are distributed so as to distribute the workpieces that have fallen from the downstream end portion of the first conveying mechanism into each of the plurality of guide paths;
a first sensor that detects first information that represents that at least one of the workpieces has fallen from the downstream end portion of the first conveying mechanism; and
a controlling device that controls an operation of the displacement mechanism in response to the first information by providing with the displacement mechanism an operation command to intermittently displace the downstream end portion of the first conveying mechanism by a predetermined distance such that the downstream end portion of the first conveying mechanism is aligned with at least a selected one of the plurality of guide paths and the workpiece that has fallen from the downstream end portion of the first conveying mechanism is allowed to pass through the selected guide path.

2. The conveying system according to claim 1,
wherein the first conveying mechanism is supported so as to be rotatable around an axis extending in a substantially vertical direction,
wherein the displacement mechanism includes a rotary mechanism that rotates the first conveying mechanism such that the downstream end portion of the first conveying mechanism is displaced along a substantially arc-shaped trajectory in a substantially horizontal plane,
wherein the plurality of guide paths of the workpiece guide are arranged in a substantially arc shape at predetermined intervals when viewed from above, and
wherein the rotary mechanism intermittently rotates the first conveying mechanism such that the downstream end portion of the first conveying mechanism is aligned with at least the selected one of the plurality of guide paths.

3. The conveying system according to claim 1,
wherein the first conveying mechanism is supported so as to be capable of being translated in the widthwise direction of the second conveying mechanism,
wherein the displacement mechanism includes a linear motion mechanism that linearly moves the downstream end portion of the first conveying mechanism in a substantially horizontal direction,
wherein the plurality of guide paths of the workpiece guide are arranged in a straight line at predetermined intervals when viewed from above, and
wherein the linear motion mechanism intermittently translates the first conveying mechanism such that the downstream end portion of the first conveying mechanism is aligned with at least the selected one of the plurality of guide paths.

4. The conveying system according to claim 1, further comprising:

a feeding mechanism that feeds the workpieces to the first conveying mechanism,
wherein the controlling device further controls the feeding mechanism in response to the first information such that the feeding mechanism feeds the workpieces to the first conveying mechanism.

5. The conveying system according to claim 1, further comprising:
a second sensor that detects second information that represents that at least one of the workpieces has passed a predetermined position between an upstream end and a downstream end of the first conveying mechanism; and
a removal mechanism that removes a desired one of the workpieces on the first conveying mechanism,
wherein the controlling device further controls the removal mechanism when a time interval between a first detection time and a subsequent second detection time, at each of which the second information is detected by the second sensor, is shorter than a predetermined time interval, by providing with the removal mechanism an operation command to remove at least one of the workpieces that has passed the predetermined position at the second detection time.

* * * * *